United States Patent

[11] 3,584,791

[72] Inventors John Frederick Stratton Blackburn;
Eric Gates, Preston, both of, England
[21] Appl. No. 754,349
[22] Filed Aug. 21, 1968
[45] Patented June 15, 1971
[73] Assignee Joseph Lucas Industries Limited
Birmingham, England

[54] FUEL SPRAYERS
3 Claims, 2 Drawing Figs.
[52] U.S. Cl....................................................... 239/404,
239/405, 239/423
[51] Int. Cl........................................................ B05b 7/10
[50] Field of Search........................................... 239/383,
398, 399, 400, 403, 404, 405, 423, 424

[56] References Cited
UNITED STATES PATENTS

| 744,220 | 11/1903 | Neu.............................. | 239/400 |
| 1,136,849 | 4/1915 | Tucker......................... | 239/424 X |
| 1,954,873 | 4/1934 | Gwathmey................... | 239/404 |
| 2,531,538 | 11/1950 | Smith........................... | 239/404 |
| 3,182,711 | 5/1965 | Robb............................ | 239/403 X |

FOREIGN PATENTS

| 1,245,788 | 10/1960 | France......................... | 239/404 |

*Primary Examiner*—Lloyd L. King
*Assistant Examiner*—Thomas C. Culp, Jr.
*Attorney*—Holman & Stern ABSTRACT: Fuel spraying apparatus having a sprayer with an annular row of outlets surrounding an axial passage for air, a first annular swirler having blades on which fuel from the outlets impinge an annular air swirler surrounding the sprayer.

PATENTED JUN 15 1971

3,584,791

INVENTORS
JOHN FREDERICK STRATTON
ERIC GATES
BY Glascock, Downing &
Seebold. ATTORNEYS

FUEL SPRAYERS

The object of this invention is to provide fuel spraying apparatus for use in gas turbine engines whereby a mixture of fuel and air is emitted into the combustion zone of the engine in a convenient manner.

Apparatus in accordance with the invention comprises the combination of a sprayer having an annularly arranged row of fuel outlets surrounding an axial passage for the admission of air, and a first annular swirler having helical blades which are so disposed in relation to the sprayer that fuel emitted from the fuel outlets will be directed onto the blades, an annular air inlet surrounding the sprayer and a second annular swirler arranged to receive air from the annular air inlet.

Figure 1:
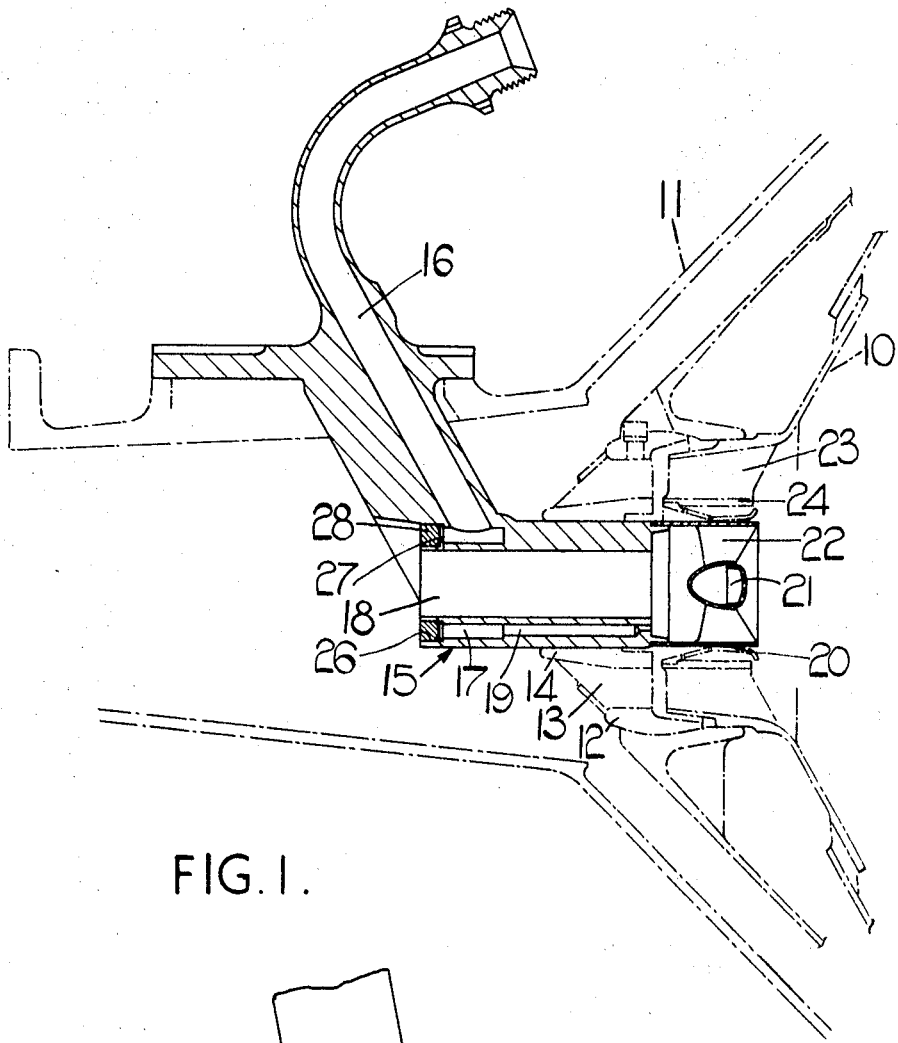
Figure 2:
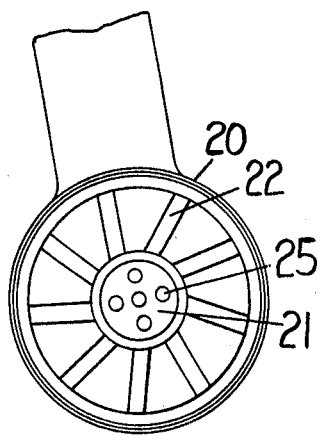

The invention will now be described by way of example with reference to the accompanying drawings in which:

FIG. 1 is a sectional side elevation of a spraying apparatus constructed in accordance with the invention installed in a gas turbine engine, and FIG. 2 is an end elevation view on an enlarged scale.

Referring to the drawings, the spraying apparatus illustrated is disposed at the upstream end of a flame tube (indicated generally at 10) of a gas turbine engine, the flame tube being surrounded by an air jacket casing 11. It is to be understood that the configuration of the flame tube and of the air jacket casing may be annular, or there may be a plurality of individual flame tubes disposed in an annular air jacket casing. In a still further arrangement, there may be individual flame tubes in individual air jacket casings.

The flame tube is supported on a part-spherical bearing surface formed on the outer ring 12 of a part defining an annular air inlet. This part has straight vanes 13 connecting the ring 12 to an inner ring 14 which surrounds and is supported by a sprayer 15.

The sprayer 15 has a fuel inlet passage 16 communicating with an annulus 17, in the body of the sprayer and through this extends a central axial passage 18 for the admission of further air to the flame tube 10. Moreover, in the forward end of the annulus 17 is formed an annular row of angularly spaced fuel outlets 19, terminating at their outlet ends in reduced diameter portions.

Carried by a sleeve 20 secured to the forward end of the sprayer body is a swirler device comprising a central boss 21 surrounded by a set of helical blades 22.

Carried by the flame tube is a further set of swirler blades 23 which are concentric with the blades 22 but are separated therefrom not only by the sleeve 20, but also by an annular part 24. The blades 23 are moreover axially aligned with and close to the vanes 13. Fuel from the outlets 19 impinge on the blades 22 and tends to be well atomized and mixed with the air which also flows between the blades 22 from the central passage 18 of the sprayer. The central boss 21 has a streamlined shape and has holes 25 in its forwardly presented face.

The rearward end of the sprayer 15, remote from the swirler blades 22, is provided with an annular recess 26 communicating with the annulus 17. The recess 26 is formed during manufacture of the annulus 17 and is filled with a washer 27 and a ring 28. During assembly of these parts, the cavity defined by the recess 26 and the washer 27 is at least partially filled with a paste consisting of a mixture of metal and a flux. Upon heating, this is caused to set to secure both the ring 28 and the washer 27 in place.

In an alternative construction (not shown) the inner set of blades are each provided at their outer edges (i.e. their edges presented to the downstream end of the engine), with spoilers which extend towards that face of an adjacent blade against which the jets of fuel impinge so that air fuel mixture flowing along the face of the blade from which the spoiler extends will be directed across the gap between two adjacent blades towards the outer edge of the adjacent blade, and thereby minimize risk of dribble of fuel from the edge of the blade. The spoilers are disposed at an angle of approximately 70° to the axis of the swirler device as a whole.

We claim:

1. Fuel spraying apparatus comprising in combination, a sprayer having an annularly arranged row of separate fuel outlets surrounding an axial passage for the admission of air, and a first annular swirler having helical blades which are so disposed in relation to the outlets that fuel emitted from the outlets will be directed onto respective ones of the blades, an annular air inlet surrounding the sprayer and a second annular swirler arranged in said annular air inlet.

2. Fuel spraying apparatus as claimed in claim 1 in which the blades of the first annular swirler are carried by a sleeve connected to the end of the sprayer.

3. Fuel spraying apparatus as claimed in claim 1 in which the annular air inlet contains a further set of vanes disposed upstream of the second annular swirler.